US009335811B2

(12) United States Patent
Long et al.

(10) Patent No.: US 9,335,811 B2
(45) Date of Patent: May 10, 2016

(54) PORTABLE ELECTRONIC DEVICE CARRIER WITH ELECTRONIC INTERFACE FOR RECHARGING DEVICE BATTERY

(71) Applicant: Protonex Technology Corporation, Southborough, MA (US)

(72) Inventors: David N. Long, Northborough, MA (US); Jeremy R. Hitchcock, Amherst, NH (US); Seth M. Dziengeleski, Southbridge, MA (US); James D. Kazmierczak, Marlborough, MA (US)

(73) Assignee: Protonex Technology Corporation, Southborough, MA (US)

( * ) Notice: Subject to any disclaimer, the term of this patent is extended or adjusted under 35 U.S.C. 154(b) by 245 days.

(21) Appl. No.: 14/041,538

(22) Filed: Sep. 30, 2013

(65) Prior Publication Data

US 2014/0095915 A1 Apr. 3, 2014

Related U.S. Application Data

(60) Provisional application No. 61/707,027, filed on Sep. 28, 2012.

(51) Int. Cl.
*H02J 7/00* (2006.01)
*G06F 1/32* (2006.01)
*G06F 1/16* (2006.01)
*G06F 1/26* (2006.01)

(52) U.S. Cl.
CPC ............ *G06F 1/3212* (2013.01); *G06F 1/1628* (2013.01); *G06F 1/1632* (2013.01); *G06F 1/26* (2013.01)

(58) Field of Classification Search
USPC ......................................................... 320/107
See application file for complete search history.

(56) References Cited

U.S. PATENT DOCUMENTS 6,184,654 B1    2/2001  Bachner, III et al.
7,743,999 B1 *  6/2010  Griffin ......................... 235/486
8,200,292 B2    6/2012  Wu et al.

(Continued)

FOREIGN PATENT DOCUMENTS

CN         202167735 U    3/2012

OTHER PUBLICATIONS

International Search Report in corresponding PCT/US2013/062622, mailed Apr. 14, 2014.

*Primary Examiner* — Suchin Parihar
(74) *Attorney, Agent, or Firm* — Adler Pollock & Sheehan P.C.; George N. Chaclas, Esq.; Daniel J. Holmander, Esq.

(57) ABSTRACT

An electronics device carrier for porting a battery powered electronic device is formed by outer walls surrounding a hollow volume. The electronic device is held within the hollow volume and can be operated without removing the electronic device from the carrier. An input interface comprising interface elements external to the outer walls provides an element suitable for interfacing with external power devices such as a power source or another power load. A device interface includes interface elements at least partially disposed internal to the outer walls for interfacing with the electronic device battery. A charge controller is disposed between the input interface and the device interface and is operable to connect elements connected to the input interface to the device battery to either recharge the device battery or use the device battery as a power source.

19 Claims, 4 Drawing Sheets

(56) References Cited

U.S. PATENT DOCUMENTS

| | | |
|---|---|---|
| 2003/0025674 A1* | 2/2003 | Watanabe ................. 345/168 |
| 2005/0231161 A1 | 10/2005 | Jones et al. |
| 2012/0201016 A1* | 8/2012 | Robertson et al. ........... 362/183 |
| 2014/0099905 A1* | 4/2014 | Jimenez ................. 455/90.2 |
| 2014/0186663 A1* | 7/2014 | Hiroki et al. ................. 429/57 |
| 2014/0292260 A1* | 10/2014 | Dyer et al. ................. 320/107 |
| 2015/0014581 A1* | 1/2015 | Kawakami et al. ........ 252/182.1 |

* cited by examiner

PORTABLE ELECTRONIC DEVICE CARRIER WITH ELECTRONIC INTERFACE FOR RECHARGING DEVICE BATTERY

1 RELATED APPLICATIONS

This application claims the benefit of priority under 35 U.S.C. §119(e) to U.S. Provisional Application No. 61/707,027, filed Sep. 28, 2012, which is incorporated herein by reference in its entirety.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2012, Protonex Technology Corporation.

3 BACKGROUND OF THE INVENTION

3.1 Field of the Invention

The invention relates to a portable electronic device carrier for carrying a battery powered portable device. In particular, the device carrier includes an integrated battery charger or charge controller, an input interface connectible to an external power or energy source, and a device interface that provides electrical access to the electronic device battery. An optional output interface is provided to connect the device battery to a power load other than the electronic device.

3.2 The Related Art

Hand held military radios such as AN/PRC-148, AN/PRC-152, and AN/PRC-153 typically use removable rechargeable batteries for power. In field operations or missions, an infantry soldier carries or ports a radio that includes a primary battery installed inside. Typically, the infantry soldier ports replacement batteries to use when the primary battery is depleted. The primary battery is typically discarded after it is depleted to reduce weight. There is a need in the art to reduce the weight of equipment that is ported by an infantry soldier and to scavenge power from power or energy sources that may become available in the field or that are already ported by the infantry solder(s) on a mission.

Conventional hand-held rechargeable military batteries are recharged with battery chargers supplied by the battery manufacturer and third party suppliers. Such battery chargers are typically standalone recharger units that include an input power interface for receiving input power from available power or energy sources, which in military environments are usually DC power sources at a fixed DC voltage but which may be powered by AC grid power. An input power or energy source, such as a DC power supply or another battery, is connected to the input power interface to power the battery charger. The battery charger includes an output interface connectable to a battery or batteries or to a battery powered electronic device that includes a battery charger interface. In either case, the battery charger determines battery type, state of charge, and other parameters related to charging the battery and delivering an appropriate recharging power signal to the battery. Typically, the charging signal is actively modified during a charge cycle to avoid damaging the battery by exceeding current limits or overcharging. Various conventional battery chargers charge one or more batteries while they are removed from the electronic device, or if the electronic device includes a suitable charging interface, a battery may be recharged while the battery is installed in the electronic device, depending on the configuration of the electronic device, the battery, and/or the battery charger.

One problem with conventional battery chargers is that they require a specific input power signal, e.g. a predetermined DC voltage and usually a specific connector configuration; neither of which may be available in military field operations. Another problem with conventional battery chargers is that the charger and the electronic device, or battery, is tethered to the power source by a wire and the electronic device is either not usable or not portable during the charging cycle. This is especially problematic in military environments where mobility and continuous use of electronic devices such as radios, night vision systems and or navigation equipment is critical to the safety of infantry personnel.

One solution to the problem of using a military radio when no charged batteries are available is addressed by a battery eliminator. A battery eliminator is an electronic device with the same form factor as the radio battery that fits into the radio in place of the primary battery. The battery eliminator includes an attached input power cord or cable tethered to the battery eliminator and connectable to a suitable input power or energy source, which is typically another battery that would not fit into the radio. Thus using the battery eliminator, the radio can be powered by sharing a battery with another device even when the shared battery does not fit into the radio. While the battery eliminator solves the problem of using the radio as a handheld device while its primary battery is removed (e.g. while the primary battery is being recharged), the radio is still tethered to the power source (another battery) and therefore not may not be portable while the battery eliminator is installed.

A solution that allows a portable electronic device to be ported while it is being charged is disclosed in U.S. Pat. No. 6,184,654 to Bachner III et al. entitled WEARABLE DOCKING-HOLSTER SYSTEM WITH ENERGY MANAGEMENT TO SUPPORT PORTABLE ELECTRONIC DEVICES. Bachner III et al disclose a wearable holster for carrying a handheld, power intensive electronic device, such as a cellular telephone. The holster includes an input power interface, a charge controller, a supplemental battery pack, and a charge/discharge controller. The charge controller is disposed between the input power interface and the supplemental battery pack and the charge/discharge controller is disposed between the supplemental battery and the cellular telephone when the cellular telephone is installed in the holster. The charge controller charges the supplemental battery pack when the wearable holster is connected to a power source. The charge controller includes power converter elements to step up or step down the voltage of a power signal received from the power source. The charge controller includes an element to terminate charging when the supplemental battery pack is fully charged. The cellular telephone interfaces with the charge/discharge controller when the cellular telephone is installed in the holster. The charge/discharge controller operates to charge the cellular telephone battery using the supplemental battery pack as an energy source. The cellular telephone can be used to make calls while it is installed in the holster and while its battery is being charged by the supplemental battery pack.

While the wearable holster disclosed by Bachner III et al. allows the cellular telephone battery to be charged while being ported by a user and allows the user to use the cellular telephone as a hand held device while it is being charged, Bachner III et al. fails to address the problem of reducing portable weight because the portable charger includes a supplemental battery pack, which is essentially the same as carrying a spare battery. Many third party vendors sell a tactical (military) radio pouch or portable electronic device carrier suitable for hands free porting of the radio by an infantry soldier in the field. The most common application for the pouch is for hands free porting of a battery/radio combination and the pouch is configured to allow the user to use the radio while it is still inside the pouch. However, in conventional embodiments, the radio battery cannot be charged while the radio is installed in the radio pouch.

A further solution is provided by SolarStik, Inc. which sells the WASP portable power adapter in various power output capacities (see www.solarstik.com). The WASP portable power adapter includes a charging head that controls a battery charging profile, an input power interface connectable to input power sources and an output power interface connectible to the battery being charged. In practice the WASP devices are used to recharge multiple types of batteries from alternative power sources, including other batteries and a solar blanket. The WASP portable power adapter is optionally sold with a wearable carrying pouch, a portable solar blanket and selected input and output wire cables suited to a particular input and output requirement. While the WASP portable power adapter can be used to recharge a radio battery and includes a wearable carrying pouch, the radio battery must be removed from the radio and the WASP portable power adapter fails to solve the problem of tethering the battery being charged to an input power source.

In view of the foregoing, there is still a need in the art for a portable radio carrier that allows the radio to be used without removing it from the radio carrier and to be charged without tethering the radio to a fixed power or energy source. Additionally, there is still a need to reduce portable weight, e.g. by reducing the number of spare radio batteries that are carried by the infantry soldier on a mission. More generally, there is a need in the art to provide more opportunities to charge device batteries without tethering the device to a power or energy supply.

4 BRIEF DESCRIPTION OF THE DRAWINGS

The features of the present invention will best be understood from a detailed description of the invention and example embodiments thereof selected for the purposes of illustration and shown in the accompanying drawings in which.

5 SUMMARY OF THE INVENTION

In view of the problems associated with conventional methods and apparatus set forth above the present invention provides a man portable battery operated electronics device carrying system that includes a battery operated electronic device and a rechargeable device battery electronically interfaced to the electronic device for powering the electronic device installed in a carrier pouch suitable for being carried on the users body such on a shoulder or body harness or attached to the users clothing. The carrier pouch includes outer walls enclosing a hollow volume for receiving the battery powered electronic device and the rechargeable device battery therein. An opening passing through the outer walls is formed to receive the battery operated electronic device and the rechargeable device battery into the hollow volume and secured in place.

An electronics module is installed inside or attached to the outside of the carrier pouch. The electronics module includes a device interface that includes a device power channel for interfacing with the device battery and a device communication channel to communicate with the device battery, the device or another data storage element to ascertain the battery type or other characteristics of the device battery including state of charge of the device communication channel. The electronics module also includes an electrical interface for electrically interface with a portable power or energy source over a power channel and a communication channel The electronics module also includes a data processor and a digital data storage module associated with the data processor for communicating with power devices operably connected to the device interface and or the electrical interface. The electronics module also includes a charge controller operated by the data processor for charging the device battery using power input by the portable power or energy source connected to the electronics interface.

The present invention also provides a method for charging a man portable battery operated device battery while the device battery is housed inside the battery operated device. The method includes installing the battery operated device into a carrier pouch that includes an electronics module for interfacing with the device battery either through the battery operated device or over a wire cable connection. The electronics module includes a device interface which is operably connected the device battery over a device power channel and a device communication channel. The electronic controller is operated to operably connect with a portable power or energy source over a power channel and a communication channel associated with electronics interface provided on the electronics module. The electronics interface is user accessible from outside the carrier pouch such that the user is able to connect a portable power or energy source to the electronic controller without removing battery operated device or the device batter from the carrying pouch.

The electronic module is operated to access data characterizing the device battery and the portable power or energy source connected to the electronic interface over appropriate communication channels.

A charge controller disposed within the electronics module between the electronics interface and the device interface is operated to charge the device battery using power input from the connected portable power or energy source.

6 DESCRIPTION OF SOME EMBODIMENTS OF THE INVENTION

6.1 Overview

Referring to FIGS. 1-4, a man portable battery operated electronic device carrying system (100) includes a device carrier comprising outer walls (110, 114) forming a pouch or similar hollow volume for receiving a battery operated electronic device (200) therein through an opening (102) that passes through the outer walls. The opening is sized to receive the battery operated electronic device into the hollow volume. Preferably the device carrier is configured for hands-free carrying and for using the electronic device for its intended purpose without removing the electronic device from the device carrier. For example the carrier (100) preferably includes user interface access features such as through holes or other user interface access features, not shown, provided so a user can operate and utilize user interface elements such as switches, a display device, an audio microphone, and audio speaker, not shown, while the battery operated device (200) is stored in the device carrier (100).

In one non-limiting example embodiment, the device carrier includes an electronics module (150) which is disposed inside the hollow volume e.g. affixed to or fit snuggly against inside surfaces of the outer walls. In another non-limiting example embodiment the electronics module (150) may be affixed to an outer wall surface of the device carrier (100). In one non-limiting example embodiment, the electronic module (150) and the device (200) each include elements suitable for electrically interfacing with a device battery (104) (shown in FIGS. 6-7) while the device battery (104) is installed inside the battery operated electronic device (200).

The electronics module (150) includes a device interface (115) that includes at least one device power channel (151) for recharging the device battery and at least one device communication channel (156) for communicating with the device and or the device battery or with any data storage module used to store information about the device battery. The device interface (115) may include wire or wireless power and communication channels and may comprise one or more standard electrical connectors for interfacing with a wire cable. In one non-limiting example embodiment, the device interface further includes at least one additional power and communication channel passing through or otherwise accessible from outside the outer wall for interfacing with a power load which may be either charged by the charge controller (160) or powered by the device battery (104).

Figure 1:
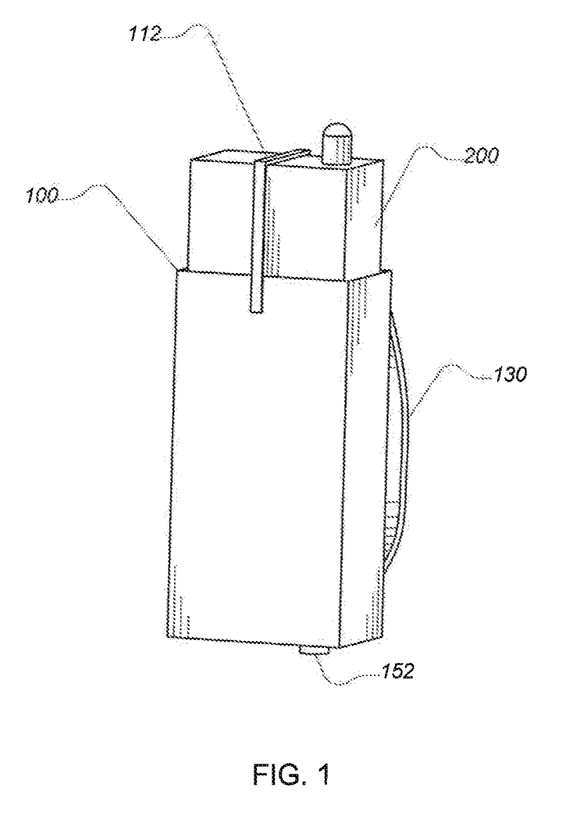
FIG. 1 depicts a perspective view of a non-limiting exemplary embodiment of an electronic device carrier with a battery operated electronics device installed inside the device carrier according to one aspect of the present invention.
Figure 2:
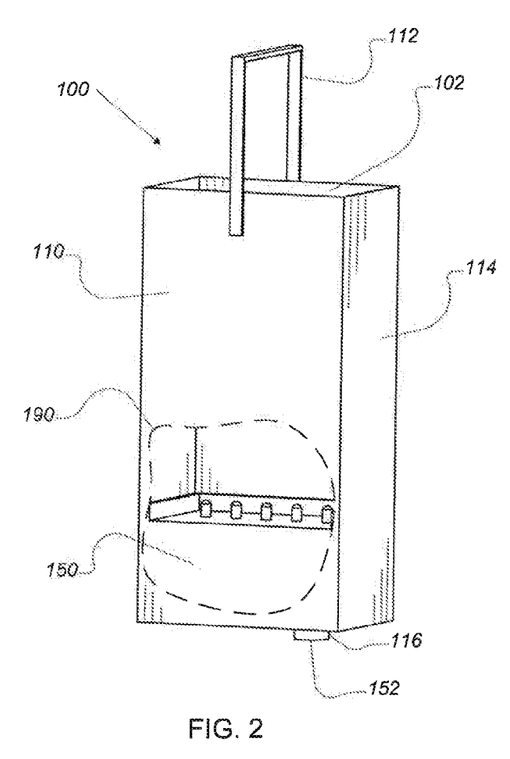
FIG. 2 depicts a non-limiting exemplary embodiment of the electronic device carrier of FIG. 1 with the electronic device removed and further illustrates a cutaway view depicting an electronics module disposed at a base portion of the electronic device carrier according to one aspect of the present invention.
Figure 3:
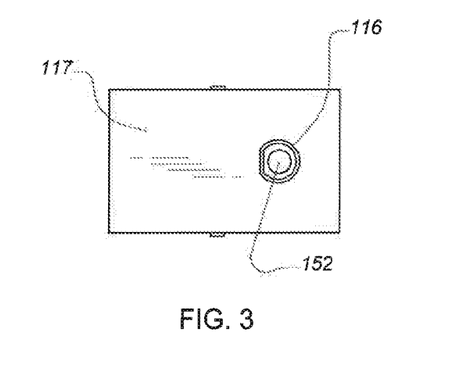
FIG. 3 depicts a bottom view of a non-limiting exemplary embodiment of the electronic device carrier shown in FIG. 1 which includes an input interface.
Figure 4:
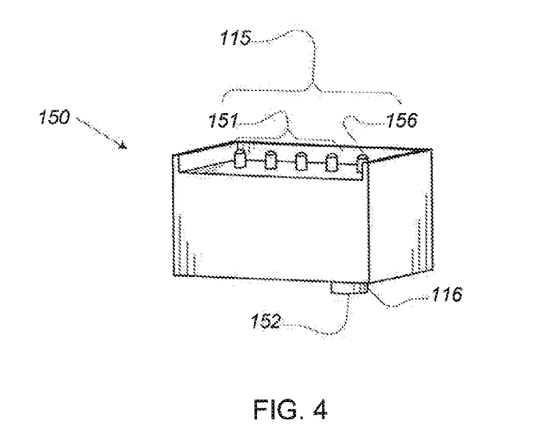
FIG. 4 depicts a perspective view of a non-limiting exemplary embodiment of the electronics module including a device interface on a top surface thereof.
Figure 6:
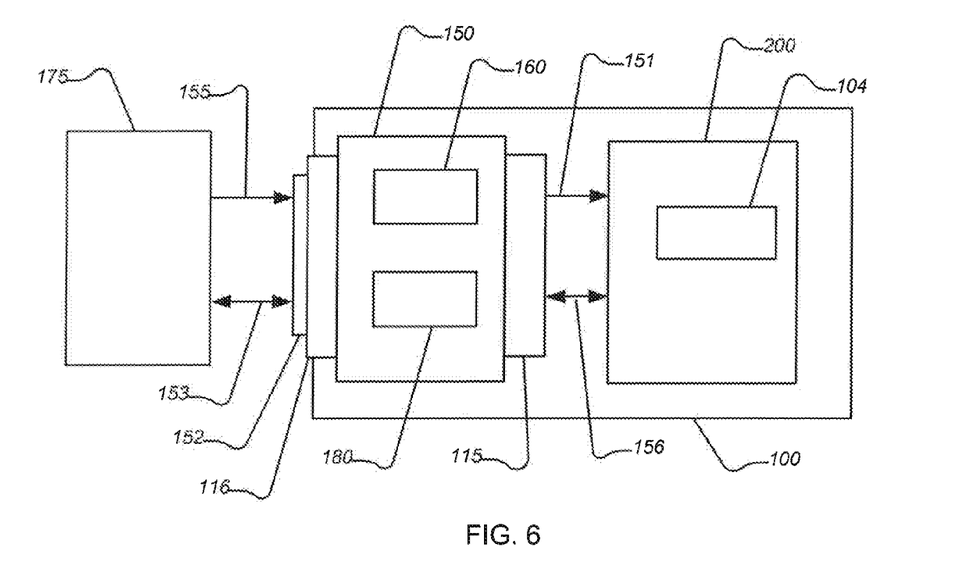
FIG. 6 illustrates a schematic view of a first non-limiting exemplary embodiment of an electronic device carrier including a battery operated electronic device according to the present invention.
Figure 7:
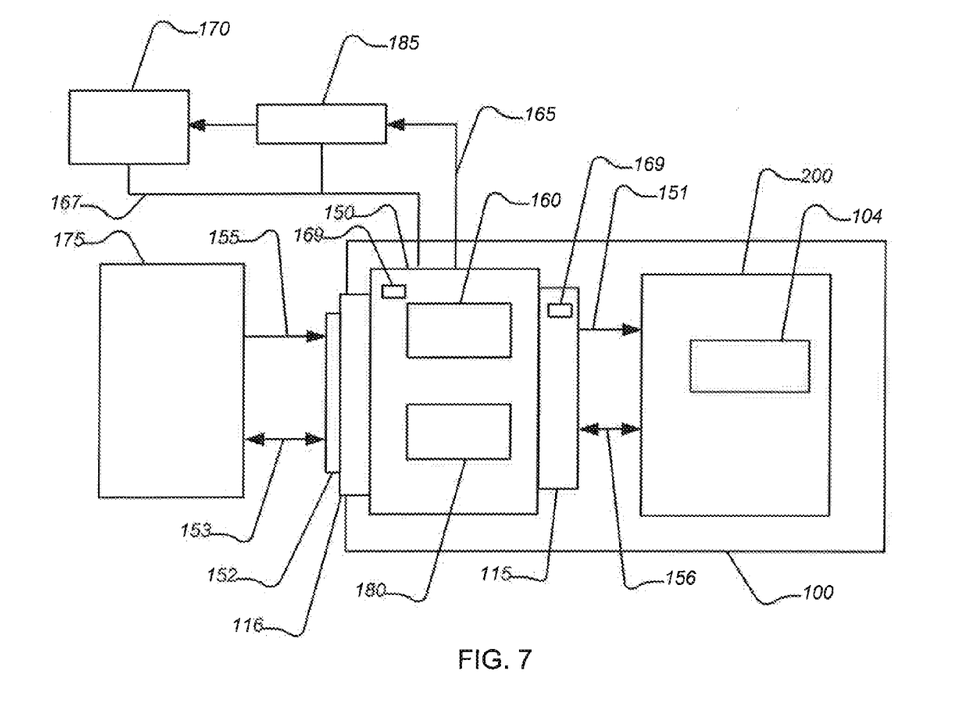
FIG. 7 illustrates a schematic view of a second non-limiting exemplary embodiment of an electronic device carrier including a battery operated electronic device according to the present invention.

Referring to FIGS. 6-7, the electronics module (150) further includes an electrical interface (116), shown in FIGS. 3 and 4 disposed external to or accessible through the outer walls, e.g. through a base wall (117) to electrically interface with an external power or energy source or with any power device that potentially provides a source of input power or energy including a power manager interfaced with a power or energy source. The electrical interface (116) includes one or more power channels (155) and one or more communication channels (153). At least one pair of power and communication channels may be incorporated in a single input port (152); however additional pairs of power and communication channels may be included as additional input ports to the electrical interface (116). The power channel (155) is connectable to a power or energy source or other power device connected to a power or energy device for receiving an input power signal there through. The power channel (155) is operably connectable to the device power channel (151) over the charge controller (160) so that a power signal entering the electrical interface (116) is modulated by a charge controller (160) for recharging the device battery (104) or in some cases for directly powering the device (200) e.g. instead of or in addition to being powered by the device battery.

The electronics module (150) comprises a charge controller (160) operated in cooperation with a data processor (180) and associated digital data memory module, which may be incorporated inside the data processor (180), or otherwise housed in the electronics module (150). The charge controller regulates power flowing between the input power channel (155) and the device power channel (151) by at least modulating current flow and is also operable a switch usable to operably disconnect the charge controller from any device connected to the device interface. The electronics module (150) communicates with the device battery (104), with the battery operated device (200), or with any other device that includes stored data related to the device battery type and or power characteristics, over a communication channel (156) in order to at least determine the battery type and in some cases the battery a state of charge. Given the battery type and state of charge, the electronic module operates to call a charging profile program from the memory module and to charge the battery (104). In another non-limiting embodiment, electronics module (150) communicates with other operably connected power loads e.g. (170), or with any other device that includes stored data related to the power characteristics of a power load connected to the device interface and given the type and state of charge of the connected power load, the electronic module operates to call a charging profile program from the memory module and to charge or directly power the connected power load from either the charge controller (150) or the device battery (104).

6.2 Item Number List

The following item numbers are used throughout, unless specifically indicated otherwise.

| # | DESCRIPTION |
|---|---|
| 100 | Carrier |
| 102 | Carrier opening |
| 104 | Device battery |
| 110 | Outer wall |
| 112 | Securing arrangement |
| 114 | Outer wall |
| 115 | Device interface |
| 116 | Electronics interface |
| 117 | Base wall |
| 130 | Attachment means |
| 150 | Electronics module |
| 151 | Device power channel |
| 152 | Input port |
| 153 | Communication channel |
| 155 | Power channel |
| 156 | Device communication channel |
| 160 | Charge controller |
| 165 | Device power channel |
| 167 | Device communication channel |
| 169 | Power sensor modules |
| 170 | Power load |
| 175 | Power source |
| 180 | Data processor |
| 185 | Switch |
| 190 | Cutaway line |
| 200 | Electronic device |
| 300 | Power manager |
| 305 | Link (or Direct Connection) |
| 310 | Power manager output port |

-continued

| # | DESCRIPTION |
|---|---|
| 320 | Power manager input port |
| 400 | Power source |
| 405 | Link |

6.3 Exemplary System Architecture

Referring now to FIGS. 1-7, one non-limiting example embodiment of the present invention includes an electronic device carrier system (100) for carrying a battery powered electronic device (200) such as a military radio. Preferably the carrier system allows hands-free carrying of the radio and in some embodiment hands-free operation of the radio. Preferably the carrier protects the electronic device from exposure to airborne moisture and/or contaminants, from shock, from damaging electromagnetic fields, and in some embodiments the carrier (100) may be water or gas tight to protect the electronic device (200) from damage by submergence in a liquid or exposure to other hostile or corrosive environments.

The device carrier system (100) includes outer walls (110, 114) and a base wall (117) forming a pouch or other hollow volume suitable for carrying the electronic device (200) inside the hollow volume for portability. The pouch includes an opening (102) at a top end thereof formed to receive the electronic device (200) there through and may include a flap, strap, drawstring, cover or other attaching or closing elements (112) provided to secure the electronic device inside the pouch and/or to seal the opening (102). The opening (102) may comprise a front, rear or bottom opening without deviating from the present invention. In addition the pouch includes one or more attaching or porting elements such as a shoulder or body harness (130) and or claims, hasps or the like (104) suitable formed and secured to the pouch for porting the carrier system attached to the user or the clothing of a user.

An electrical interface (116) passes through an outer wall of the pouch and may be fixedly attached to or integrally formed with one or more of the outer walls or the electronic module (150). In either case the electrical interface (116) is preferably accessible by a user from outside the carrier (100). The interface (116) includes one or more input ports (152) each comprising a power and a communication channel disposed on or accessible through one or more of the outer walls. In one non-limiting example embodiment, an external power or energy source (175) is electrically interfaced to the interface (116) by a wire or cable connector interfaced with the input port (152) which comprises a terminal suitably matched to the wire or cable connector.

Preferably the power energy source (175) is portable and already carried by the user for powering another device. Example power or energy sources include a man or vehicle portable solar blanket or solar panel, a man or vehicle portable electrochemical fuel cell or battery, a man or vehicle portable wind turbine or other portable current generators including user worn electro-mechanical power generating devices that generates energy in response to user movement and or user body heat. In one particularly beneficial embodiment the power source (175) is installed in an electronic device that is already carried by the user such as a rechargeable battery installed in another electronic device being carried by the user, e.g. in a navigation system, weapons system, night vision system, computer system, or the like, that the user normally carries. In addition in preferred embodiments a wire cable connects the power or energy source (175) to the input interface (116). In particular, when the power source (175) is a power source installed in another device, the other device preferable includes a device interface connectable to the wire cable that provides communication and power channels leading to the rechargeable battery installed therein. Moreover the wire cable is sufficiently free from encumbrances to allow normal hand held operation of the device (200), during charging, e.g. when the device (200) is a military radio and to allow normal hand held operation of the power source (175) when it is connected to the electronic interface (116). In further example embodiments of the present invention the interface (116) and electronic module (150) are compatible with connecting to non-portable DC power or energy sources such as an AC to DC power converter connected to grid power or a non-portable mechanical power generator, or any other DC power or energy sources. Accordingly, the electrical interface (116) may include a plurality of different wire electrical connectors or wireless electrical interfaces, e.g. induction coupled power interfaces and or wireless communication interfaces, suitable for connecting to different power devices such as the power or energy source (175).

The electronics module (150) further comprises a device interface (115) provided to interface with the battery powered electronic device (200) while the device (200) is stored in the carrier (100). The device interface at least includes a device power channel (151) for delivering a charge signal to the device battery (104) and a device communication channel (156) for communicating with any one of the battery powered device (200), the device battery (104) and or a smart cable or other data storage device accessible by the device communication channel to retrieve information about the battery type, power characteristics or the like. In another non-limiting example embodiment the device interface (115) includes one or more cable connectors suitable for interfacing with the device (200), the battery (104) and or an external power load (170), described below, by a wire cable which may comprise a smart cable capable of storing information (e.g. in a read only memory), about the connected device (200), battery (104) or power load (170) in cases where another power load is connected to the device interface as described below. Accordingly the electronics module (150) may receive data from and or exchange data with the device (200), the battery (104), a smart cable (e.g. 165) or an external power device (175) that is operably connected to the device communication channel (153) or other device communication channels associated with the device interface (115). In particular the communication exchanges relate to managing power exchanges between the electronic module (150) and any power loads connected to the device interface (115).

According to the present invention, the electronics module (150) includes a charge controller (160) operated by a data processing device (180) such as a Central Processing Unit (CPU), Field Programmable Gate Array (FPGA), or the like, and a digital memory module interfaced with or incorporated within the data processor (180). The data processor (180) includes or is interfaced with one or more communication interfaces (e.g. SMBus. WiFi, Ethernet, or the like), associated with the communication channels of the electronic interface (116) and the device interface (115). Accordingly a communication interface is provided between the electronic module (150) and various power devices operably connected with the electronic module for exchanging digital data with or for receiving digital data from connected power devices such as the device (200), the battery (104), the power load (170) and or any smart cables used to interface a power device with the electronic module. Additionally the electronics module may include a plurality of different communication interface devices and or software communication protocols operating thereon to communicate with connected devices using a communication protocol that is matched to the device communication protocol.

According to the present invention, the electronics module (150) includes energy management schema operating thereon configured to determine configuration data such as which devices are operably connected to each electrical interface, to determine the device type of each device, the state of charge of each connected power device or of any batteries associated with connected power devices and if available to collect additional digital data related to the power characteristics of each operably connected power device. Once the configuration data is collected, the energy management schema operates the electronics module to determine if any of the connected power or energy sources is suitable as a potential power or energy source usable to charge the battery (104), if the battery (104) needs to be charged. Alternately or additionally the energy management schema operates the electronic module to charge or share power with any power loads e.g. (170) connected to the device interface (115). Additionally the electronics module (150) operates to periodically update the configuration data and store a configuration profile in a memory operating on the electronics module.

If certain conditions are met, e.g. the power or energy source (175) is compatible with charging the battery (104) and the battery (104) needs to be charged, the electronics module (150) initiates a charging cycle using a suitable charging profile and interrupts or ends the charging cycle when the battery (104) is fully charged, when the system configuration changes, or when a higher priority charging task is detected or selected by a user.

To initiate a charging cycle, the electronics module (150) selects a charge profile that is compatible with the type of device being charged or directly power as the case may be. In the example of the battery (104) the charge profile may be based on a generic charging profile used for all batteries of a particular battery type, e.g. with a particular battery chemistry or with a particular battery operating voltage range. In further examples, a device-specific charging profile having additional charging profile parameters may be used, e.g. with an upper current limit an average current range or with a variable current limit that varies with the battery temperature or the battery state of charge, or the like. More generally a charge cycle is initiated when a suitable power or energy source (175) is detected at the electronics interface (116). In particular when the device (175) provides input power within a DC voltage range that is compatible with the charge cycle and sufficient current input to charge the battery (104) according to the selected charging profile. The charge profile at least causes the charge controller to modulate the charging current to not exceed predefined current limits and may modulate the charging current to reduce current as the battery approaches its fully charged voltage thereby avoiding over charging and or to further modulate current in a manner that prevents battery damage or is otherwise dictated by the charging profile. Additionally the charge controller may be used as a switch to operably disconnect the charge controller from the device interface (115), e.g. when no power device or a non-compatible power device is connected.

6.3.1 Power Sensors

In a further non-limiting example embodiment, the electronics module (150) includes one or more power sensor modules (169) associated with one or more of the power channels (151, 155, 165) with each power sensor in communication with the data processor (180). The sensing modules (169) provide real time voltage and or current measurement which are usable to detect if a power device is connected to an electrical interface (115, 116) and in some cases to determine the device type and state of charge of the connected power device according to power sensor feedback, e.g. voltage. More generally the electronics module (150) communicates with connected power devices to obtain digital information that identifies the connected device and may include more detailed information including a charging profile. The device identity may include a battery type, battery operating voltage range, e.g. the voltage spread between fully charged vs. discharged, battery charging current requirements such as peak and average current limits, battery chemistry, a recommended battery charging profile, battery manufacturer, make and model, and or other information usable to identify the battery and make battery charging or discharging decisions. Alternately only a battery type and state of charge is ascertained by the electronics module (150) in which case the energy management schema operates the electronics module look up power characteristics of the battery such as battery operating voltage range and current requirements, battery chemistry and a battery charging profile based on a battery type profile stored in memory on the electronics module. In particular given the battery type; the electronics module correlates battery type with a battery characteristic profile, e.g. stored in a look up table, data base or the like and uses the battery characteristic profile stored on the electronics module to make battery charging or discharging decisions and to select a charging profile. In addition, the charge controller (160) periodically communicates with connected devices to determine the device state of charge of the device battery and if a connected power source (175) is suitable for charging the device battery (104) or the external power load (170).

6.3.2 Output Power Channel

Referring now to FIG. 7, in a further non-limiting example embodiment of the present invention, the device interface (115) includes device power channel (165) suitable for connecting an external power load (170) to the electronic module (150). A communication channel (167) extends from the electronics module (150) to the external power load (170) to communicate with the power load (170), with any batteries associated with the power load (170) or with a smart cable or the like connecting the power load to the device interface. In addition the power sensor module (169) is usable to detect power conditions at the device power channel (165) and the power conditions as well as any communications received over the communication channel (167) is used by the data processor (180) to make a decision as to whether the load (170) can or should be powered by the charge controller (160).

The switch (185) is operable to connect the device power channel (165) to the output of the charge controller (160) such that the charge controller (160) is operable to charge the battery (104) alone, the load (170) alone or both at the same time if the charge profiles are compatible. Similarly the device battery can be connected to the load (170) independently of the device charger to power the load (170) using the device battery (104). The power distributed over the power channel (165) is usable to charge batteries associated with the power load (170) or to directly power the power load (170) if the charge controller (160) can provide an appropriate power signal. In one non-limiting example embodiment the device power channel (165) comprises a cable connected to the device interface (115) through a connector that is accessible through or from outside the outside walls 110, 114, and 117).

The switch (185) may be operable by the data processor (180), by a user, or by or by another control element such as a fail over device operable to connect or disconnect the power load (170) to or from the electronic module (150) by actuating the switch (185). In either case switching the charge controller from distributing power from one device to another may include charging the charge profile or otherwise altering the output power.

In one particularly useful embodiment of the present invention described above, the electronic device (200) is a handheld or portable battery powered military radio such as any one of models AN/PRC-148, AN/PRC-152, or AN/PRC-153 which utilizes one or a plurality of removable rechargeable battery cells such as a 12 volt, 5 watt 4800 mAH lithium ion battery.

The processor (180) may comprise a CPU and an associated memory module provided to store programs, data, operating software modules, algorithms, battery charging profiles, various communication protocols, battery type look up tables and other data and software interfaces as may be required to communicate with power sources, batteries, power loads, and to operate the charge controller (160) as required to draw power from the power or energy source (175), to distribute power to the battery (104) or the power load (170) with an appropriate charging profile or power signal and to distribute power from the battery (104) to the power load (170) using an appropriate power signal. In some embodiments the CPU provides communication protocol conversion between connected devices and the electronics module (150). In some embodiments, the CPU is used to run a peak power point tracking algorithm when the power source has a widely fluctuating input power characteristic such as widely fluctuating voltage or current as may be the case when the power sources is a solar blanket or wind or water turbine. In order to accomplish this, the CPU has the ability to measure various power parameters at both the input and the battery to control the charge rate based upon input power available.

6.3.3 Method for Charging

In an exemplary method for charging an electronic device battery (104) the electronic device (200) is placed in the carrier pouch. Power and data terminals make mating contact with corresponding power and data terminals of the device interface (115). In cases where the electronic device (200) includes a device interface operably connected with the battery (104) the power and data terminals of the electronic module (150) are operably connected to the battery (104). In cases where the device (200) does not include a device terminal, the battery (104) is operably connected to the electronics module by a wire cable, (not shown) or in some cases battery terminals may be accessible to directly interface with the device interface (115).

Electronics module (150) communicates with the battery (104), the device (200) or a smart cable or other device disposed between the electronics module (150) and the battery (104) to retrieve digital data identifying and or otherwise characterizing the battery (104) and determining the battery state of charge. Battery information may include battery operating voltage range, e.g. the voltage spread between fully charged vs. discharged, operating current requirements, battery chemistry, battery type, battery charging profile, battery make and model, and or other information usable to identify the battery and make battery charging or discharging decisions including selecting a charging profile. Alternately only a battery type and state of charge is ascertained by the electronics module (150) in which case the electronics module operates to look up power characteristics for that particular battery type. In particular the electronics module includes a database or look up tables listing power characteristics vs. battery type and accesses power characteristics and or charging profiles based on battery type information. Specifically power characteristics may include battery operating voltage range, peak and average charging current, battery chemistry and or a more detailed battery charging profile. Accordingly, given the battery type the electronics module correlates battery type with a battery characteristic profile, e.g. stored in a look up table, data base or the like, and uses the battery characteristic profile retrieved from memory to make battery charging or discharging decisions including selecting a charging profile.

In a further step of the method for charging the device battery a power or energy source (175) is operably connected to electronics interface (116) by a cable connection or other suitable interface. Preferably the power source (175) is portable, e.g. a man or vehicle portable solar blanket or solar panel, a man or vehicle portal fuel cell, a man or vehicle portable wind turbine or other portable current generator including a user worn electro-mechanical system that generates power in response to user movement, but any DC power source having a suitable voltage and current profile is usable without deviating from the present invention. In one particularly beneficial embodiment the power source (175) is already carried by the user and is not an auxiliary power source adding extra weight to the user's equipment. Thus the power source (175) may comprise a rechargeable battery or batteries operating in other electronic devices being carried by the user, e.g. in a navigation system, weapons system, night vision system, flash light, or the like, that the user normally carries. In addition the cable connecting the power supply (175) to the electronic interface (116) is sufficiently free from encumbrances to allow normal hand held operation of the device (200), during charging, e.g. when the device (200) is a military radio.

In further steps of the method, power and communication connections between the electronics module (150) and the input power source (175) are operably established over the power channel (155) and the communication channel (153). Once detected, the electronic module (150) communicates with power source (175) to access information about the device including device type, available power or state of charge, operating voltage and current limits or the like. Alternatively, the sensor module (169) measure voltage and or current associated with connected device (175) and the data processor (180) operates to identify the connected device by matching the measured voltage and or current to know device characteristics. Alternately only the device type is detected and the power characteristics are determined from data relating device type to device power characteristics stored on the electronics module (150). In the case where charge controller (150) receives power sensor input, a communication link with the power devices (104) and (175) may not be established.

The electronic module (150) determines if the available power source voltage is compatible with charging the device battery (104) and if the state of the charge of the power source (175) and the battery (104) are suitable for initiating a recharging cycle. If so, the electronics module operates to select an appropriate charging profile and to initiate a suitable charging cycle until the battery (104) is fully charged or until the system configuration is changed.

Thus according to one aspect of the present invention when the electronic device (200) is installed in the device carrier (100), the device power channel (151) and communication channels (156) remain operably connected to the electronics module such that the electronics module operates to continuously monitor the state of charge of the battery (104) and recharge the battery whenever unallocated power is available through the electronics interface (116). Additionally according to a further aspect of the present invention, recharging the battery (104) can occur while the device (200) is in use and the power available from the electronics module (150) can be used to operate the device (200) without actually charging the device battery or while charging the device battery. Meanwhile the device battery (104) remains installed in the electronic device (200) during charging and non-charging periods such that the device (200) is continuously operable while it is in the carrier system (100). In contrast with conventional embodiments, the device (200) does not require a cable connection between the device battery and an external power source (175) or other external power device as is the case with a battery eliminator. In further contrast with conventional embodiments the device battery (104) can be charged without removing the device (200) from the carrier and without removing the battery (104) from the device (200).

In a further exemplary non-limiting method embodiment of the present invention, the battery (104) is not rechargeable and the electronic device (200) is operable to use battery power when external power provided through the electronics module is not available and to use power delivered by the electronics module (150) when available.

Referring to FIG. 7, in a further operating mode the electronics module (150) is operable to distribute power to the operably connected power load (170) through the device interface (115) when a suitable power source (175) is connected to the electronics interface (116). In another operating mode, the electronics module (150) is operable to distribute power to the operably connected power load (170) using input power obtained through the device interface (115) from the battery (104).

In one method embodiment a power load (170) is connected to device interface (115) with the switch (185) set to prevent a power exchange over the device power channel (165). An initial communication establishes if the device (170), batteries associated with the device (170), or a smart cable associated with the device (170) are able to communicate power characteristics and state of charge data to the device processor (180). If so the information is processed to select a charge profile or appropriate output signal and if warranted by other conditions the switch (185) is activated to operably connect the device power channel (165) to the charge controller (160). Thereafter power is distributed to the power load (170) from either the power source (175) or the power source (104) depending on the configuration and state of charge of each device. Otherwise if the power load (170) is not compatible with the charge controller (160) or if the available power sources (175) and (104) are not sufficiently charged to share power with the device (170) switch (185) is not activated to connect the power load (170) with the charge controller (160) and data processor (180) may send a message to the power load (170) that power is not available.

More generally, the data processor (180) energy management schema in the form of programs or other algorithms stored in the memory module or operating on the data processor to make power configuration and distribution decisions. In an exemplary method, data processor (180) receives inputs related to all connected devices which may include device identification, a device type, a power load priority, state of charge, and power characteristics such as operating voltage range, peak and average charging current, device chemistry, device temperature, and the like. Communication with the connected devices may be with the device itself or with a battery associated with the device or with a smart cable or other data storage element associated with the device. Communication with the connected devices may comprise receiving data points e.g. device type and state of charge or may comprise exchanging more detailed data over a network connection e.g. when devices exchange a series of queries and response. Based on the initial communication exchanges the processor (180) establishes a configuration map usable to make power distribution decisions. The data processor (180) further uses the energy management schema to manage and distribute power to the highest priority devices first and then to lower priority devices only when sufficient power is available. In one non-limiting example operating mode wherein the battery (104) has the highest power priority; the processor (180) may distribute power from the battery (104) to the load (170) whenever the state of charge of the battery (104) exceeds 50% but discontinues power distribution from the battery (104) once the state of charge of the battery (104) drops below 50%.

6.3.4 Power Manager Interface

Figure 5:
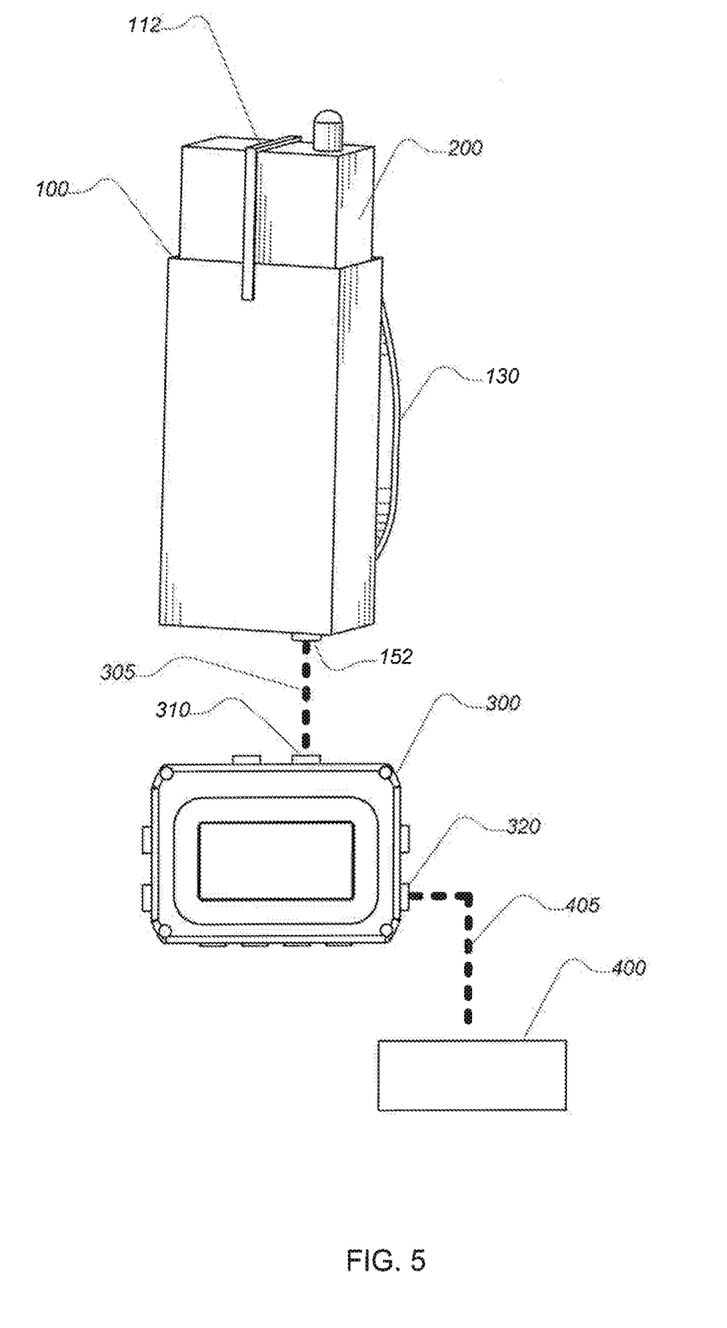
FIG. 5 depicts a perspective view of a non-limiting exemplary embodiment of the electronic device carrier of FIG. 1 connected to a power or energy source through a power manager.

Referring now to FIG. 5 a power manager (300) functions as an input power source. The power manager (300) includes a plurality of device ports e.g. (310) that can be interfaced with the carrier system input port (152) over a wire cable connection. The wire cable connection includes a power channel for receiving input power from the power manager and a communication channel for exchanging communication signals between the power manager and the electronic module (150). The power manager is further connected to one or more power or energy sources (400) at a device port (320) over a wire cable (405) which includes power and communications channels. In one non-limiting example embodiment, the power manager (300) is disclosed in co-pending commonly assigned U.S. patent application Ser. No. 12/815,994 to Robinson et al. entitled PORTABLE POWER MANAGER filed on Jun. 15, 2010 which is incorporated herein in its entirety. In the present example embodiment, the power manager and the electronic module (150) communicate to determine power availability and the power manager distributes power to the electronics module (150) for distribution to the device (200) and or any other a power load (170) that may be connected to the device power channel (165) as shown in FIG. 7.

As illustrated in FIG. 5, power manager (300) is connected to power or energy source (400) through cable link (405) that connects to an input port (e.g., 320). The power manager includes input power converters capable of converting an input voltage to the voltage of a power bus operating on the power manager. The power manager includes output power converters capable of converting the bus voltage to an output voltage suitable for input to the electronics module (150) through the input port (152). In one example operating mode the electronics module (150) sends power characteristics to the power manager (300) including its operating voltage range. If the operating voltage range of the electronics module is matched to the power manager bus voltage the power manager distributes power to the electronics module (150) at the bus voltage. If the operating voltage range of the electronics module is not matched to the power manager bus voltage the power manager set a power converter to convert the voltage of the power signal being distributed to the electronic module to the operating voltage range of the electronic module (150).

The power manager (300) may be carried by the infantry solder and remain connected to a plurality of different power devices including the electronic device carrier (100) of the present invention over an extended field mission and used to manage power usage over a plurality of power loads and to scavenge power from a plurality of power sources which may also comprise power loads. Thus the system of the present invention eliminates the need to carry spare batteries to replace the battery (104) in cases where the total available portable power reachable either by the electronics controller (200) or by the power manager (300) connected to the electronics controller (150) can meet the power needs of the entire mission. Since it is unknown prior to a mission which devices will be used more than other devices the present invention provides enough flexibility to use substantially all available power sources to power substantially all available power loads even when one load uses more power than is available from a single battery, e.g. the battery (104). Thus a spare battery (104) specific for the electronic device (200) does not need to be carried and the primary battery (104) does not need to be replaced when it becomes discharged or nearly discharged as long as other devices carried by the user have remaining charge. Instead the electronics module (150) is usable to distribute power to the battery (104) through the charge controller (160) to recharge the battery (104) directly from a suitable power source (175) or from a power source (400) that is available through the power manager (300).

In some embodiments (not shown), the pouch outer housing (110) includes additional openings, pockets, and/or other receptacles for carrying one or more power managers (300), power sources (175, 400), and/or power loads (170) therein. In addition the device (200) may include a microphone, headset, antenna or other elements extending from the device (200) which in some cases extend through the outer walls. In further example embodiments the charge controller (160, 180) may be incorporated within the electronic device (200) or within the battery (104). In further example embodiments the charge controller (160, 180) may be incorporated within in the power manager (300). In further example embodiments the electronics module (150), power manager (300), and power source (400) (e.g. a battery), may be carried together in the electronic device carrier (100) which is configured to include external interface elements provided to interface with other power devices for power transfer and communication.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications (e.g. man-portable military use), those skilled in the art will recognize that its usefulness is not limited thereto and that the present invention can be beneficially utilized in any number of environments and implementations where it is desirable to secure a device for transport while it is connected to at least one power source without tethering thereto, permit use of the device while it is secured for transport, permit charging of a device battery while it is secured for transport, permit connection of a charger and/or a power source, that can comprise a power manager, to a device while it is secured for transport and without tethering, and enable use of a device battery to power other devices while it is secured for transport. Accordingly, the claims set forth below should be construed in view of the full breadth and spirit of the invention as disclosed herein.

What is claimed:

1. A man portable battery operated electronics device carrying system comprising:
    a. a battery operated electronic device and a rechargeable device battery electronically interfaced to the electronic device for powering the electronic device;
    b. a carrier for porting the battery powered electronic device and the rechargeable device battery comprising outer walls enclosing a hollow volume for receiving the battery powered electronic device and the rechargeable device battery therein and an opening passing through the outer walls formed to receive the battery operated electronic device and the rechargeable device battery into the hollow volume;
    c. an electronics module associated with the carrier comprising:
        i. a device interface comprising a first device power channel, a second device power channel operably connected to a power load, a first device communication channel, and a second device communication channel;
        ii. an electrical interface for electrically interfacing with an external power or energy source comprising a power channel and a communication channel;
        iii. a charge controller, a data processor and a digital data storage module associated with the data processor for communicating with power devices operably connected to each of the device interface and the electrical interface and for distributing power input to the electrical interface to power devices operably connected to the device interface,
    wherein the electronics module is operable: to connect the power load connected to the second device power channel to the charge controller; and charge the power load connected to the second device power channel from the charge controller; and power the power load connected to the second device power channel from the device battery.

2. The carrier system of claim 1 further comprising electrical interface elements disposed between the device battery and an external surface of the battery operated device for electrically interfacing the device battery with the device interface when the battery operated device is installed in an operating position inside the hollow volume of the carried system.

3. The carrier of claim 2 wherein the electrical interface elements comprise a power channel and a communication channel and the battery operated device includes a data storage module associated with the communication channel for storing data relating to characteristics of the device battery.

4. The carrier of claim 2 wherein the electrical interface elements comprise a power channel and a communication channel and the device battery includes a data storage module associated with the communication channel for storing data relating to characteristics of the device battery.

5. The carrier system of claim 1 further comprising a wire cable interconnecting the device battery with the device interface when the battery operated device is installed in an operating position inside the hollow volume of the carried system.

6. The carrier of claim 5 wherein the wire cable comprises a power channel and a communication channel and the wire cable includes a data storage module associated with the communication channel for storing data relating to characteristics of the device battery.

7. The carrier system of claim 1 wherein the electronics module is disposed inside the hollow volume and the electrical interface is configured to be user accessible from outside the outer walls.

8. The carrier system of claim 1 wherein the electronics module is disposed outside the hollow volume and the device interface is configured to be user accessible from inside the hollow volume.

9. The carrier system of claim 7 wherein the opening is closable by one or more securing elements for securing the electronic device inside the hollow volume.

10. The carrier system of claim 9 wherein the outer walls and the one or more securing elements are constructed to maintain a substantially water and or gas tight environment inside the hollow volume.

11. The carrier system of claim 1 further comprising one of attaching and porting elements secured the outer walls for one of porting the carrier system attached to the body of a user and porting the carrier system attached to the clothing of the user.

12. The carrier system of claim 1 further comprising a power or energy source comprising a rechargeable battery installed in another battery powered device operably connected to the electronic interface by a wire cable.

13. The carrier system of claim 1 further comprising a power manager disposed between the power or energy source and the electronic interface.

14. The carrier system of claim 1 further comprising a power load connected to the device interface by a wire cable.

15. The carrier system of claim 14 further an operable switch disposed between the charge controller and the power load connected to the device interface, wherein the operable switch is operable by the electronics module.

16. A method for charging a man portable battery operated device battery while the device battery is housed inside the battery operated device comprising:

installing the battery operated device into a carrier pouch wherein the carrier pouch includes an electronics module and wherein each of the battery operated device and the electronics module includes a device interface for operably connecting the device battery to the electronics module over a device power channel and a device communication channel;

operably connecting a portable power or energy source to a power channel and a communication channel of an electrical interface associated with the electronics module wherein the electrical interface is user accessible from outside the carrier pouch;

operating the electronics module to access data characterizing the device battery and the portable power or energy source over appropriate communication channels;

operating a charge controller disposed within the electronics module between the electrical interface and the device interface to charge the device battery using power input by the operably connected portable power or energy source;

operably connecting a power load to a second power channel and a second communication channel associated with the device interface;

operating the electronics module to connect the power load connected to the second power channel to the charge controller; and, operating the electronics module to one of;

charging the power load connected to the second power channel from the charge controller; and, powering the power load connected to the second power channel from the device battery.

17. The method of claim 16 wherein the portable power or energy source comprises a power manager interfaced with at least one power or energy source.

18. The method of claim 16 further comprising operating a switch disposed along the second power channel to operably connect the portable power load to and disconnect the portable power load from the device battery.

19. The method of claim 16 further comprising operating the charge controller as a switch to operably connect charge controller to and disconnect the charge controller to from the device interface.

* * * * *